US 6,594,035 B1

United States Patent
Kresch et al.

(10) Patent No.: US 6,594,035 B1
(45) Date of Patent: Jul. 15, 2003

(54) SYSTEM AND MEMORY-BUFFER MANAGEMENT METHOD FOR REDUCING RANDOM ACCESS MEMORY REQUIREMENTS IN ERROR DIFFUSION HALFTONE APPLICATIONS

(75) Inventors: Renato Kresch, Haifa (IL); Doron Shaked, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/375,703

(22) Filed: Aug. 16, 1999

(51) Int. Cl.[7] .................... G06K 15/00; G06K 9/36
(52) U.S. Cl. ............... 358/3.03; 358/3.05; 382/251
(58) Field of Search .................... 358/3.03, 3.05, 358/3.06; 382/251, 252

(56) References Cited

U.S. PATENT DOCUMENTS

| | | | |
|---|---|---|---|
| 5,159,470 A | 10/1992 | Ishida et al. ............ 358/457 |
| 5,373,455 A | * 12/1994 | Edgar .................... 364/571.01 |
| 5,467,201 A | 11/1995 | Fan ........................ 358/447 |
| 5,497,154 A | * 3/1996 | Komamura ............... 341/131 |
| 5,535,019 A | 7/1996 | Eschbach ................. 358/456 |
| 5,737,453 A | 4/1998 | Ostromoukhov ........... 382/275 |
| 6,347,115 B1 | * 2/2002 | Lin ......................... 375/240 |
| 6,352,328 B1 | * 3/2002 | Wen ........................ 347/15 |

* cited by examiner

Primary Examiner—Jerome Grant, II

(57) ABSTRACT

An error diffusion halftoning system and a method of managing halftoning errors utilize a quantization technique to reduce the required size of a primary error buffer that is needed to diffuse the halftoning errors. By implementing the quantization technique, the primary error buffer can be reduced from an 8-bits-per-bin error buffer to a 2-bits-per-bin error buffer for 256 grayscale. The reduction in bin size decreases the cost of the primary error buffer and, consequently, the cost of an error diffusion halftoning (EDH) device of the system that generates halftone values from grayscale values of a digital image. The quantization technique is executed on cumulated half-toning errors, derived from apportioned halftoning errors associated with previously processed pixels. In addition, the system and method utilize an error diffusion procedure to diffuse quantization errors that are produced from the execution of the quantization technique. In one embodiment, entire quantization errors are sequentially transmitted to a supplemental error diffuser, so that each quantization error can be introduced to the grayscale value of the next pixel to be processed. In another embodiment, the quantization errors are apportioned using predefined multiplicative parameters and eventually diffused to two or more unprocessed pixels that are adjacent to the pixel currently being processed.

25 Claims, 5 Drawing Sheets

$$Q(x) = \begin{cases} 0 & x \leq -37 \\ 1 & -37 < x \leq -5 \\ 2 & -5 < x \leq 27 \\ 3 & 27 < x \end{cases}$$

QUANTIZATION

FIG. 3

$$Q^{-1}(q) = \begin{cases} -56 & q = 0 \\ -22 & q = 1 \\ 9 & q = 2 \\ 41 & q = 3 \end{cases}$$

DE-QUANTIZATION

FIG. 4

SYSTEM AND MEMORY-BUFFER MANAGEMENT METHOD FOR REDUCING RANDOM ACCESS MEMORY REQUIREMENTS IN ERROR DIFFUSION HALFTONE APPLICATIONS

TECHNICAL FIELD

The invention relates generally to halftoning techniques and more particularly to an error diffusion halftoning technique.

BACKGROUND ART

Digital images provide a convenient format for transmission, modification, and/or reproduction of images. When an image is captured digitally, grayscale information for each pixel of an image is extracted. Typically, 256 grayscale levels are utilized to extract the grayscale information. However, the majority of printers that are currently in use are binary with respect to their printing methods. That is, the printers operate to reproduce the original image either by depositing or by refraining to deposit a small amount of ink or toner for each pixel of the captured image. The binary nature of these printers allows only two levels of grayscale to be printed for each pixel. Thus, digitally captured images having more than two levels of grayscale cannot be reproduced by the binary printers, unless a special printing technique, such as halftoning, is utilized.

A halftoning technique is a process for printing different shades of grayscale by varying the density of "dark" pixels that have been deposited with ink or toner. A lower density of dark pixels equates to a lighter shade of grayscale, while a higher density of dark pixels equates to a darker shade of grayscale. Since the density of dark pixels can vary in numerous degrees, the number of grayscales that can be produced using the halftoning technique is far greater than two levels. As long as the pixels are sufficiently small, the individual dark pixels will not be apparent to a viewer. Instead, the viewer will see smooth areas having different shades of grayscale, which are directly related to the density of dark pixels.

A common type of halftoning technique is known as "an error diffusion halftoning technique." In error diffusion halftoning, a halftoning error associated with a generated halftone signal for each pixel of a digital image is distributed among neighboring pixels in order to determine which pixel should be deposited with ink or toner. The halftone signal is derived by comparing a given value, which is a combined value of a grayscale value of a pixel and a cumulative error from previously processed pixels, with a predefined threshold value. The difference between the given value and the halftone value is the halftoning error. By distributing the halftoning errors, the density of dark pixels will be determined by the grayscale values from a number of surrounding pixels. Consequently, regions of the digital image having lighter shades of grayscale will yield lower densities of dark pixels, while regions having darker shades of grayscale will yield higher densities of dark pixels. In this fashion, digital images having more than two shades of grayscale can be printed using a binary printer.

In FIG. 1, a conventional system 10 that executes error diffusion halftoning is shown. The system includes an input device 12, an error diffusion halftoning (EDH) device 14, and a binary output device 16. The input device provides a digital image that is to be printed by the binary output device. The input device may be a scanner that can capture the digital image from a photograph, a digital camera that can capture the digital image from an actual scene, or a storage device that can receive the digital image from an external source. The error diffusion device includes a summing unit 18, a thresholding module 20, a subtraction unit 22, an error diffuser 24, and an error buffer module 26.

In operation, the system 10 processes the digital image by sequentially operating on the image pixels of the digital image in a raster scan order, which is a left-to-right, top-to-bottom sequence. For each pixel of the image, a grayscale value $g_{i,j}$ of that pixel is transmitted from the input device 12 to the summing unit 18 of the EDH device 14, where $g_{i,j} \in [0,255]$ for 256 grayscale. The values i and j identify the row and column, respectively, of the current pixel being processed. The summing unit 18 combines the grayscale value $g_{i,j}$ with a final error $e_{i,j}$ and outputs a summed value $s_{i,j}$. The final error $e_{i,j}$ is derived from halftoning errors associated with the previous pixels that were processed by the EDH device. The summed value $s_{i,j}$ is then transmitted to the thresholding module 20 and the subtraction unit 22. The thresholding module compares the summed value $s_{i,j}$ to a threshold value, e.g., 127 for 256 grayscale. The comparison produces an output halftone value $h_{i,j}$, which is one of two values, e.g., 0 or 255. If the summed value $s_{i,j}$ is less than the threshold value, the output halftone value $h_{i,j}$ equates to a first value, e.g., 0, that directs the output device 16 to refrain from depositing ink or toner. However, if the summed value $s_{i,j}$ is equal to or greater than the threshold value, the output halftone value $h_{i,j}$ equates to a second value, e.g., 255, that directs the output device to deposit the ink or toner.

The output halftone value $h_{i,j}$ is also transmitted to the subtraction unit 22 to derive a halftoning error that results from converting the summed value $s_{i,j}$ into one of two halftone values. The subtraction unit subtracts the halftone value $h_{i,j}$ from the summed value $s_{i,j}$. The result of this operation is a halftoning error $n_{i,j}$, which is transmitted to the error diffuser 24. The error diffuser then divides the halftoning error $n_{i,j}$ using a known distribution process, such as the Floyd-Steinberg error diffusing process. The divided halftoning errors are transmitted to the error buffer module 26. The error buffer module processes the divided halftoning errors, such that each divided halftoning error can be diffused into a neighboring pixel of the current pixel. These divided halftoning errors are combined with other divided halftoning errors from previously processed pixels to form final errors that are to be diffused into subsequently processed pixels. The final errors are temporarily stored in an error buffer (not shown) within the error buffer module. The error buffer has a capacity to store the final errors for an entire row of image pixels. For 256 grayscale, each bin of the primary error buffer is an 8-bit bin. When the grayscale value $g_{i,j+1}$ of the next pixel is processed, a final error $e_{i,j+1}$ stored in the bin of the error buffer associated with that pixel is transmitted to the summing unit 18. This final error is combined with the grayscale value $g_{i,j+1}$ and the above-described process is repeated. In this fashion, the halftoning errors from the pixels of the digital image are distributed to reproduce the digital image as a halftone image using the binary output device 16.

Although conventional error diffusion halftoning systems, such as the system 10, operate well for their intended purpose, what is needed is a cost-efficient error diffusion system and a method of managing errors in such a system.

SUMMARY OF THE INVENTION

An error diffusion halftoning system and a method of managing halftoning errors utilize a quantization technique to reduce the required size of a primary error buffer that is needed to diffuse the halftoning errors. By implementing the quantization technique, the primary error buffer can be reduced from an 8-bits-per-bin error buffer to a 2-bits-per-bin error buffer for 256 grayscale. The reduction in bin size decreases the cost of the primary error buffer and, consequently, the cost of an error diffusion halftoning (EDH) device of the system that generates halftone signals from grayscale values of a digital image.

The error diffusion halftoning system includes an input device, the EDH device, and a binary output device. The input device may be a digital scanner, a digital camera, or a storage device that can acquire digital images. The binary output device may be a conventional inkjet or laser printer. The EDH device is operatively connected to the input device and the binary output device to process grayscale pixel values of a given digital image from the input device, generating halftone signals, and to transmit the generated halftone signals to the binary output device. The halftone signals are used by the binary output device to decide whether to deposit or to refrain from depositing ink or toner in order to print a halftone image in accordance with the given digital image. In addition, the EDH device operates to manage the halftoning errors that are produced from the generation of the halftone signals.

The EDH device includes a summing unit, a thresholding module, a subtraction unit, an error diffuser, and a quantization-error diffusion (QED) module. The summing unit is positioned to receive a grayscale value from the input device and a corresponding final error from the QED module for each pixel being processed by the EDH device. The final error contains halftoning errors and quantization errors from previously processed grayscale values. The halftoning errors are the resulting products of a thresholding operation executed by the thresholding module, while the quantization errors are the resulting products of a quantization operation executed by the QED module. The summing unit combines the received grayscale value and the received final error to produce a summed value, which is transmitted to the thresholding module and the subtraction unit.

After the summed value is received by the thresholding module, the summed value is thresholded by the thresholding module using a predefined threshold value to generate a halftone signal. The halftone signal is then transmitted to the binary output device to control the depositing operation of the output device. The halftone signal is also transmitted to the subtraction unit, where the summed value from the summing unit is subtracted by the halftone signal to derive a halftoning error. The halftoning error is used by the error diffuser to distribute portions of the halftoning error to different components of the QED module, so that the portions of the halftoning error can be diffused to unprocessed pixels that are adjacent to the current pixel being processed. In the preferred embodiment, the error diffuser is configured to generate four apportioned halftoning errors from the halftoning error using a Floyd-Steinberg scheme. That is, the halftoning error is multiplied using parameters a, b, c and d, where $a=3/16$, $b=5/16$, $c=1/16$ and $d=7/16$. However, the error diffuser may be configured to generate the four apportioned halftoning errors using a different set of parameters. In an alternative embodiment, the error diffuser may be configured to generate any number of apportioned halftoning errors using a corresponding number of predefined parameters.

The QED module operates to manage the apportioned halftoning errors for each pixel of the digital image being processed. The apportioned halftoning errors from different pixels are combined by the QED module and added to selected pixels when these pixels are processed by the EDH device.

The QED module includes the primary error buffer, an intermediate error buffer, a supplemental error buffer, a quantization unit, a de-quantization unit, and three weighting units. The primary error buffer includes a number of bins. Each bin of the primary error buffer has a capacity to store 2-bit information. The number of bins included in the primary error buffer is not critical to the invention. However, the primary error buffer contains a sufficient number of bins to store error information for an entire pixel row of a typical digital image that is to be processed by the system. The intermediate error buffer is a 3-bin buffer that can temporarily store three apportioned halftoning errors from the error diffuser. Similarly, the supplemental error buffer is a single bin buffer that can temporarily store the remaining apportioned halftoning error from the error diffuser. Notice that the number of bins in the intermediate and supplemental error buffers is the number of error terms to which the error is diffused. These numbers are equal to four in the present case, but may be greater or less. The intermediate and supplemental error buffers are of size 8 or more bits per bin. The intermediate error buffer is configured such that when the next pixel is processed, values stored in the bins are shifted to the left. The stored value in the far left bin of the intermediate error buffer, however, is transmitted to the quantization unit of the QED module. This configuration allows apportioned halftoning errors from different pixels to be combined and stored within the bins of the intermediate error buffer.

The quantization unit is configured to convert the stored value in the left bin of the supplemental error buffer into a quantized value using a predefined quantization table. The operation of the quantization unit produces a quantization error, which is diffused in a manner similar to the diffusion of the halftoning error. In one embodiment, the quantization error is apportioned by the three weighting units using predefined multiplicative parameters to produce three apportioned quantization errors. One of the apportioned quantization errors is transmitted to the supplemental error buffer, while the two remaining apportioned quantization errors are transmitted to the middle and right bins of the intermediate error buffer. In another embodiment, the entire quantization error is combined with an apportioned halftoning error and transmitted to the supplemental error buffer, so that the quantization error can be introduced to the grayscale value of a pixel that is to be processed next.

The de-quantization unit of the QED module is coupled to the primary error buffer. When a grayscale value of a pixel is received by the EDH device, a quantized value that corresponds to that pixel is extracted from a bin of the primary error buffer. The quantized value is then expanded by the de-quantization unit using a predefined de-quantization table. The de-quantized value is combined with a stored value in the supplemental error buffer, resulting in a final error. The final error is then added to the grayscale value of the pixel being processed to derive a summed value that will be used to generate the halftone signal. In this manner, the halftoning errors and the quantization errors of previously processed pixels are diffused to grayscale values of subsequently processed pixels.

BRIEF DESCRIPTION OF THE DRAWINGS

FIG. 3 is an example of a quantization table utilized by the error diffusion halftoning system of FIG. 2.

FIG. 4 is an example of a de-quantization table utilized by the error diffusion halftoning system of FIG. 2.

DETAILED DESCRIPTION

Figure 1:
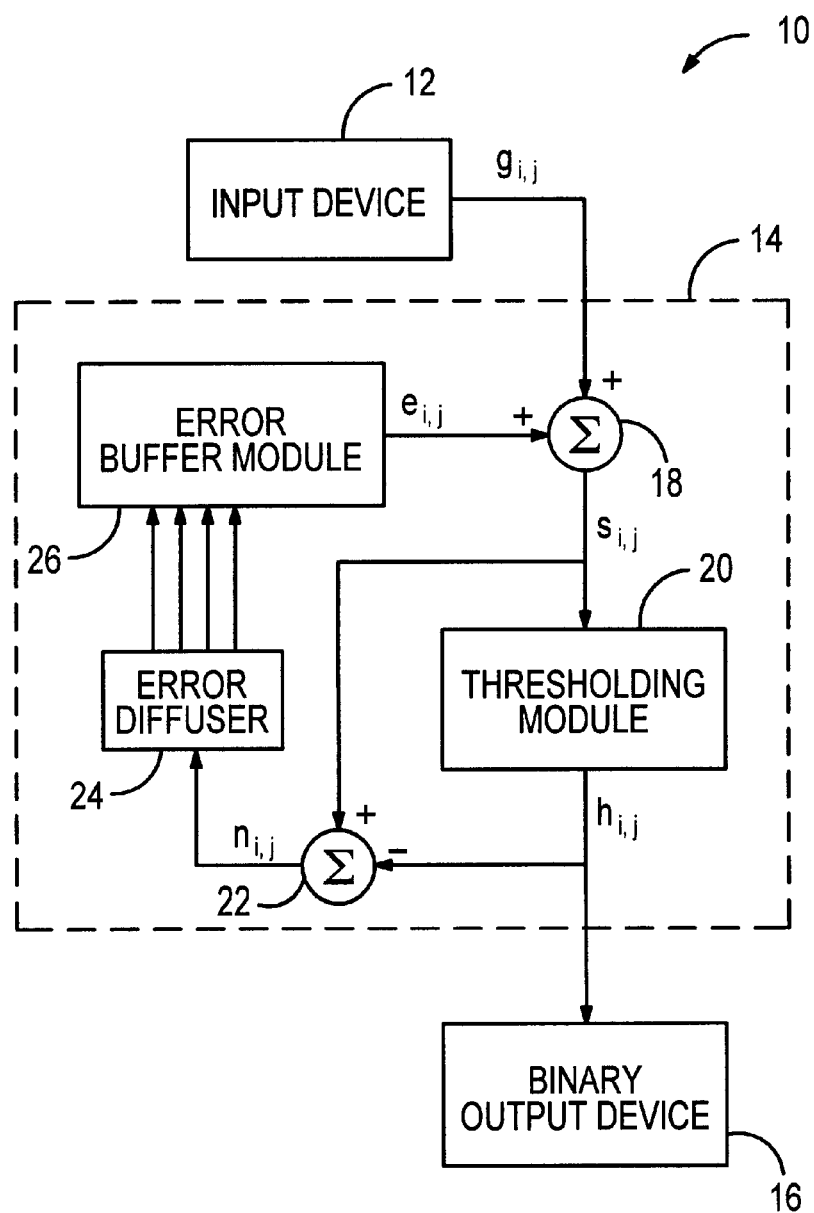
FIG. 1 is a schematic illustration of a prior art error diffusion halftoning system.
Figure 2:
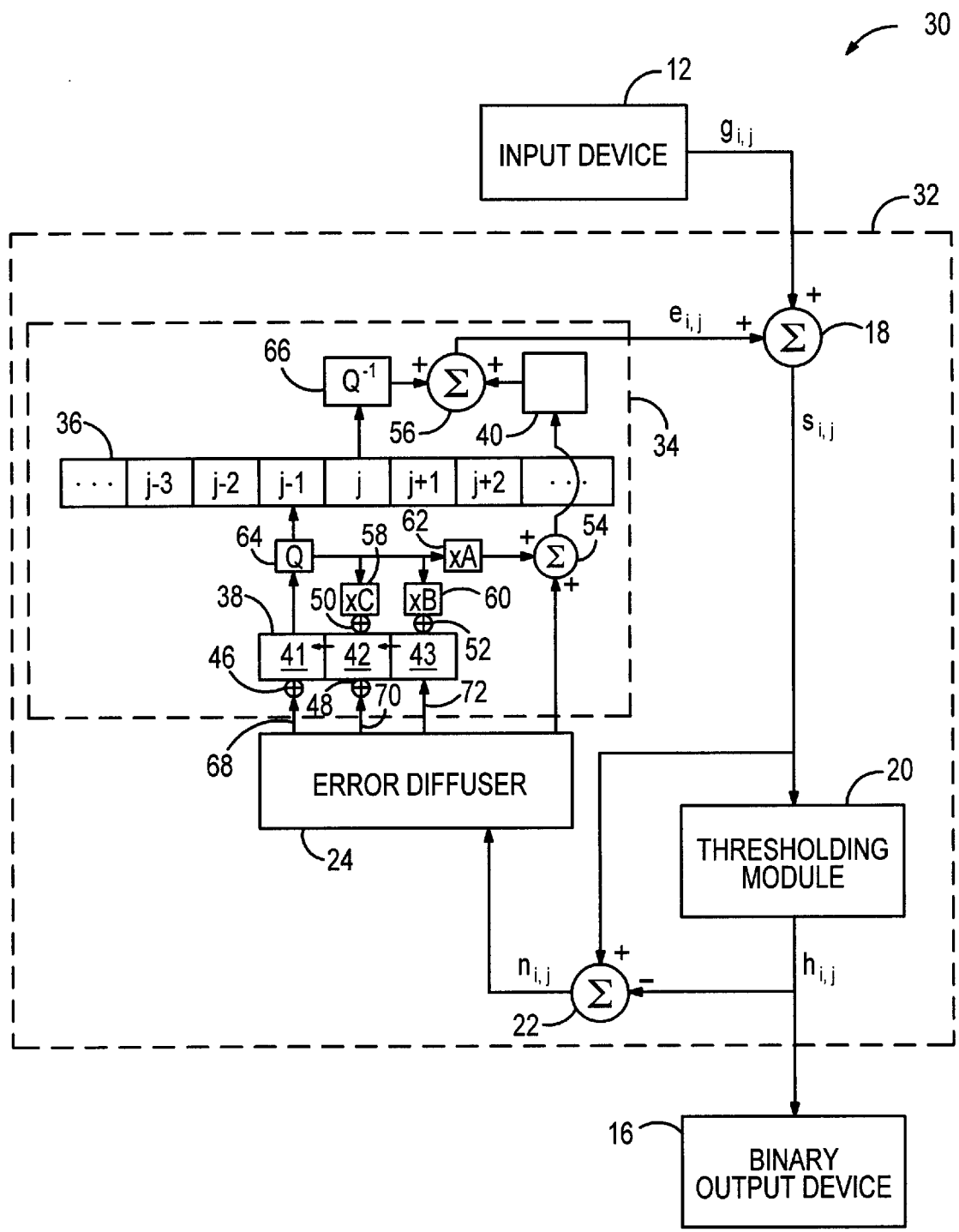
FIG. 2 is a schematic illustration of an error diffusion halftoning system in accordance with the present invention.

With reference to FIG. 2, an error diffusion halftoning system 30 in accordance with the invention is shown. The system includes a number of conventional devices. Therefore, the same reference numerals of FIG. 1 will be used to identify these conventional devices. The system 30 includes the input device 12, an error diffusion halftoning (EDH) device 32, and the binary output device 16. The input device may be a digital scanner, a digital camera, or a storage device that can acquire digital images. The binary output device may be a typical inkjet or laser printer. The EDH device is operatively connected to the input device and the binary output device to process gray-scale pixel values of a given digital image from the input device, thereby generating halftone signals, and to transmit the generated halftone signals to the binary output device. The halftone signals are used by the binary output device to decide whether to deposit or to refrain from depositing ink or toner. In addition, the EDH device operates to manage the halftoning errors that result from the generation of the halftone signals.

The EDH device 32 includes the summing unit 18, the thresholding module 20, the subtraction unit 22, the error diffuser 24, and a quantized-error diffusion (QED) module 34. Similar to the error buffer module 26 of system 10, the QED module operates to manage the diffused halftoning errors that are associated with each pixel of a given digital image. However, the operational design of the QED module allows a primary error buffer 36 having 2-bit bins to be used, instead of a standard 8-bit bin error buffer, for 256 grayscale. Consequently, the cost of manufacturing the EDH device 32 is significantly reduced.

The QED module 34 includes the primary error buffer 36, an intermediate error buffer 38, and a supplemental error buffer 40. The primary error buffer includes a number of bins. Each bin of the primary error buffer has a capacity to store 2-bit information. The number of bins included in the primary error buffer is not critical to the invention. However, the primary error buffer contains a sufficient number of bins to store error information for an entire pixel row of a digital image that is to be processed by the system 30. The intermediate error buffer is a 3-bin buffer that operates to temporarily store apportioned halftoning errors from the error diffuser 24. The error diffuser is preferably configured to distribute an input value, i.e., a halftoning error, using the Floyd-Steinberg scheme in which the input value is divided into four values, $\frac{1}{16}$th, $\frac{3}{16}$th, $\frac{5}{16}$th, and $\frac{7}{16}$th of the original input value. However, other distribution schemes may be utilized by the error diffuser to generate four different divided values of the halftoning error. In an alternative embodiment, the error diffuser may be configured to generate three or less apportioned halftoning errors using a corresponding number of predefined parameters, in which case the intermediate buffer will include the number of error terms minus one. In the preferred embodiment, the intermediate error buffer includes three bins 41, 42 and 43. These bins of the intermediate error buffer are of size 8 or more bits per bins. The supplemental buffer is a single bin buffer. The bin of the supplemental buffer is also of size 8 or more bits.

The QED module 34 further includes summing units 46, 48, 50, 52, 54 and 56, weighting units 58, 60 and 62, a quantization unit 64, and a de-quantization unit 66. The summing unit 46 is coupled to the bin 41 of the intermediate error buffer 38, while the summing unit 48 is coupled to the bin 42. Both of these bins are connected to the error diffuser 24 via paths 68 and 70, respectively. The summing unit 46 operates to add a first error value, received from the error diffuser 24 through the path 68, to the value stored in the bin 41 of the intermediate error buffer. The first error value is $\frac{3}{16}$th value of the original halftoning value that is received by the error diffuser. Similarly, the summing unit 48 adds a second error value, i.e., $\frac{5}{16}$th value, from the error diffuser to the value stored in the bin 42 of the intermediate error buffer. However, the bin 43 of the intermediate error buffer is directly coupled to the error diffuser via path 72 to receive a third error value, i.e., $\frac{1}{16}$th value, from the error diffuser.

The summing unit 50 is coupled to the bin 42 of the intermediate error buffer 38, while the summing unit 52 is coupled to the bin 43. Each summing unit 50 and 52 is connected to one of the three weighting units 58, 60 and 62. The summing units 50 and 52 are connected to the weighting units 58 and 60, respectively. The weighting units 58, 60 and 62 are operatively connected to the quantization unit 64, which is coupled to the bin 41 of the intermediate error buffer 38 and the "j-1" bin of the primary error buffer 36. The quantization unit operates to quantize the value from the bin 41 of the intermediate error buffer, using a predefined quantization table. An exemplary quantization table is shown in FIG. 3. Consequently, the quantization introduces a quantization error, which is transmitted to the weighting units 58, 60 and 62. Each of the weighting units multiplies the quantization error by predefined weighting parameters to derive a weighted quantization error. In one embodiment, the weighting parameters that are utilized by the weighting units are as follows: A=0.5; B=0.25; and C=0.25. Using these quantization error weighting parameters is preferable for image quality considerations. However, if computational efficiency is an important factor, the following alternative is a good trade-off between halftone pattern quality and computational complexity. The alternative weighting parameters are as follows: A=1.0; B=0; and C=0.

The weighted quantization error from the weighting unit 58 is added to the value stored in the bin 42 of the intermediate error buffer 38 by the summing unit 50, while the weighted error from the weighting unit 60 is added to the value stored in the bin 43 of the intermediate error buffer by the summing unit 52. The weighted quantization error from the weighting unit 62 is transmitted to the summing unit 54, where it is summed with the fourth error value, i.e., $\frac{7}{16}$th value of the original halftone value, from the error diffuser 24. The resulting summed value from the summing unit 54 is then transmitted to the supplemental error buffer 40.

The supplemental error buffer 40 is coupled to the summing unit 56, as well as the summing unit 54. The summing unit 56 is positioned to receive information from the de-quantization unit 66, which is connected to the "j" bin of the primary error buffer 36. The de-quantization unit operates to de-quantize the value stored in the "j" bin, using a predefined de-quantization table. An exemplary de-quantization table is shown in FIG. 4. The de-quantized value is then transmitted to the summing unit 56 that combines the de-quantized value with the value from the supplemental error buffer 40. The resulting summed error value is transmitted out of the QED module 34 as a final error and into the summing unit 18, where it is summed with a grayscale value of a pixel currently being processed.

Figure 5:
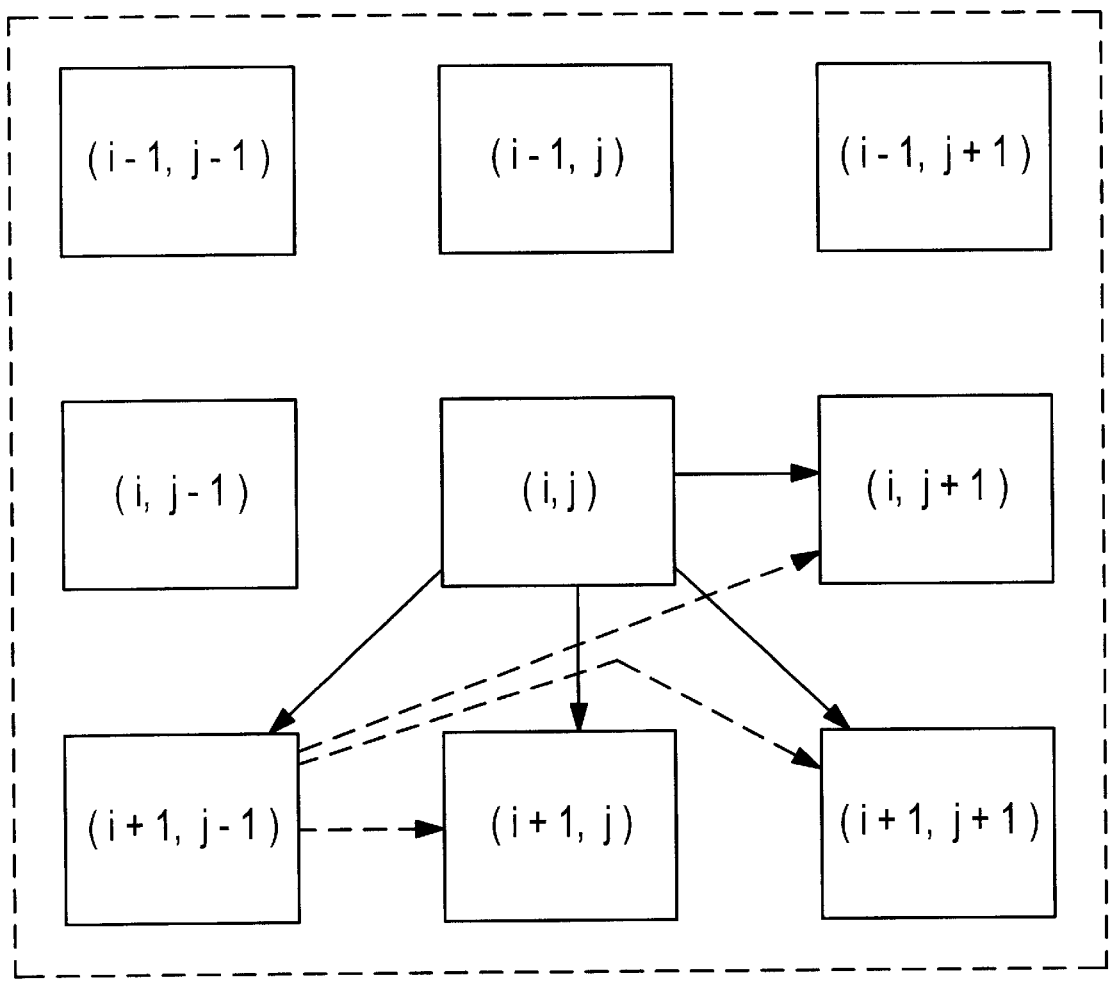
FIG. 5 illustrates the distribution of halftoning and quantization errors from a pixel currently being processed by the system of FIG. 2 to its neighboring unprocessed pixels.

The mode of operation for the error diffusion halftoning system 30 will now be described with reference to FIG. 5. FIG. 5 illustrates the distribution of halftoning and quantization errors from a pixel currently being processed by the system to its neighboring unprocessed pixels. Initially, the input device 12 acquires a digital image that will be processed by the system. The input device may capture the digital image from an actual scene or from a photograph, depending on input device. If the input device is a storage device, the digital image may have been received from an external source, such as a database of images. Preferably, the digital image is a 256 gray-scale image, although the system may be modified to accommodate digital images having fewer or more grayscales.

In order to print the digital image, grayscale pixel values of the input image are sequentially transmitted to the EDH device 32 in a raster scan order, which is a left-to-right, top-to-bottom sequence. For a pixel currently being processed, a grayscale value $g_{i,j}$ of that pixel is transmitted from the input device 12 to the summing unit 18, where $g_{i,j}$ ∈[0,255] for 256 grayscale. The values i and j identify the row and column, respectively, of the current pixel being processed. The current pixel is identified as pixel (i,j) in FIG. 5. The summing unit 18 adds the grayscale value $g_{i,j}$ and a final error $e_{i,j}$ and outputs a summed value $s_{i,j}$. The final error $e_{i,j}$ is derived from halftoning and quantization errors associated with selected pixels that were previously processed by the EDH device. The selected pixels are shown in FIG. 5 as pixels (i−1,j−1), (i−1,j), (i−1,j+1), and (i,j−1) that are adjacent to the current pixel (i,j). The summed value $s_{i,j}$ is then transmitted to the thresholding module 20 and the subtraction unit 22. The thresholding module compares the summed value $s_{i,j}$ to a threshold value, e.g., 127 for 256 grayscale. The comparison produces an output halftone value $h_{i,j}$, which is one of two values, e.g., 0 or 255. If the summed value $s_{i,j}$ is less than the threshold value, the output halftone value $h_{i,j}$ equates to a first value, e.q., 0, that directs the output device 16 to refrain from depositing ink or toner. However, if the summed value $s_{i,j}$ is equal to or greater than the threshold value, the output halftone value $h_{i,j}$ equates to a second value, e.g., 255, that directs the output device to deposit the ink or toner.

The output halftone value $h_{i,j}$ is also transmitted to the subtraction unit 22 to derive a halftoning error that results from converting the summed value $s_{i,j}$ into one of the two halftone values. The subtraction unit subtracts the output halftone value $h_{i,j}$ from the summed value $s_{i,j}$. The result of this operation is a halftoning error $n_{i,j}$, which is transmitted to the error diffuser 24. The error diffuser then divides the halftoning error $n_{i,j}$ using the Floyd-Steinberg error diffusing scheme, and distributes the divided errors into different components of the QED module, so that these divided errors can be diffused to selected adjacent pixels of the current pixel being processed, as shown by the solid arrows in FIG. 5. These adjacent pixels are identified in FIG. 5 as pixels (i+1,j−1), (i+1,j), (i+1,j+1), and (i,j+1). However, as previously noted, the error diffuser may be configured to divide the halftoning error $n_{i,j}$ using a different scheme than the Floyd-Steinberg error diffusing scheme.

The first divided value, i.e., the 3/16th value of the halftoning error $n_{i,j}$ is transmitted to the summing unit 46, while the second divided value, i.e., the 5/16th value of the error $n_{i,j}$ is transmitted to the summing unit 48. The first and second divided values will eventually be diffused to the pixels (i+1,j−1) and (i+1,j), respectively. The summing unit 46 adds the first divided value to the value stored in the bin 41 of the intermediate error buffer 38. Similarly, the summing unit 48 adds the second divided value to the value stored in the bin 42. The third divided value, i.e., the 1/16th value of the halftoning error $n_{i,j}$, is transmitted directly to the bin 43 of the intermediate error buffer. The third divided value will eventually be diffused to the pixel (i+1,j+1). The bin 43 is always empty when a divided value from the error diffuser 24 is received. This is due to the fact that the values stored in the bins of the intermediate error buffer are shifted to the left when a subsequent pixel value is processed by the EDH device 32. The values stored in the bins 42 and 43 are shifted to the bins 41 and 42, respectively. The value stored in the bin 41, however, is transmitted to the quantization unit 64.

The quantization unit 64 quantizes the stored value from the bin 41 of the intermediate error buffer 38, using the quantization table of FIG. 3. The quantized value is transmitted to the "j−1" bin of the primary error buffer 36. The "j−1" bin will be read when the pixel value of the pixel (i+1,j−1) is processed by the EDH device 32. In addition to generating the quantized value, the quantization unit is configured to generate a quantization error that is distributed to the weighting units 58, 60 and 62. The weighting units 58, 60 and 62 distributes portions of the quantization error to the intermediate error buffer 38 and the supplemental error buffer 40, using the weighting parameters A, B and C.

In one embodiment, the weighting parameters A, B and C are predefined such that A=0.5, B=0.25, and C=0.25. In this embodiment, the weighting unit 58 transmits a first portion of the quantization error, i.e., the product derived by multiplying the quantization error with C, to the summing unit 50, while the weighting unit 60 transmits a second portion, i.e., the product derived by multiplying the quantization error with B, to the summing unit 52. The summing unit 50 adds the first portion to the value stored in the bin 42 of the intermediate error buffer. Similarly, the summing unit 52 adds the second portion to the value stored in the bin 43. The third portion of the quantization error, i.e., the product derived by multiplying the quantization error with A, is transmitted to the supplemental error buffer 40 via the summing unit 54. The first, second and third portions of the quantization error are distributed to the intermediate and supplemental error buffers 38 and 40, so that these divided errors can be diffused to selected adjacent pixels of the pixel currently being processed, as shown by the dotted arrows in FIG. 5. These adjacent pixels are identified in FIG. 5 as pixels (i+1,j), (i+1,j+1), and (i,j+1).

In another embodiment, the weighting parameters A, B and C are predefined such that A=1.0, B=0, and C=0. In this embodiment, the entire quantization error is transmitted to the supplemental error buffer 40, so that the quantization error can be diffused into the pixel (i,j+1), which is the next pixel to be processed by the EDH device 32.

In both embodiments, the summing unit 54 combines the value from the weighting unit 62 with the fourth divided value, i.e., 7/16th of the halftoning error $n_{i,j}$, from the error diffuser 24. The resulting summed value from the summing unit 54 is transmitted to the supplemental buffer 40. This summed value will then be used to derive the final error value that is to be added to the grayscale value of the pixel (i,j+1).

The final error value $e_{i,j}$ that was added to the pixel value $g_{i,j}$ by the summing unit 18 is derived in the following manner. The stored value in the "j" bin of the primary error buffer 36 of the QED module 34 is extracted and transmitted to the de-quantization unit 66. Using the de-quantization table of FIG. 4, the de-quantization unit expands the value from the "j" bin. The expanded value is transmitted to the summing unit 56, where the expanded value is summed with the value from the supplemental error buffer 40, resulting in the final error value $e_{i,j}$. The value from the supplemental error buffer includes a portion of a halftoning error, as well as a portion of a quantization error or the entire quantization error, that are associated with the previously processed pixel value. When the next pixel value $g_{i,j+1}$ is processed by the system 30, the value stored in the "j+1" bin of the primary error buffer 36 is processed to derive the final error $e_{i,j+1}$. In this fashion, each pixel value of the digital image is processed by the system.

Figure 6:
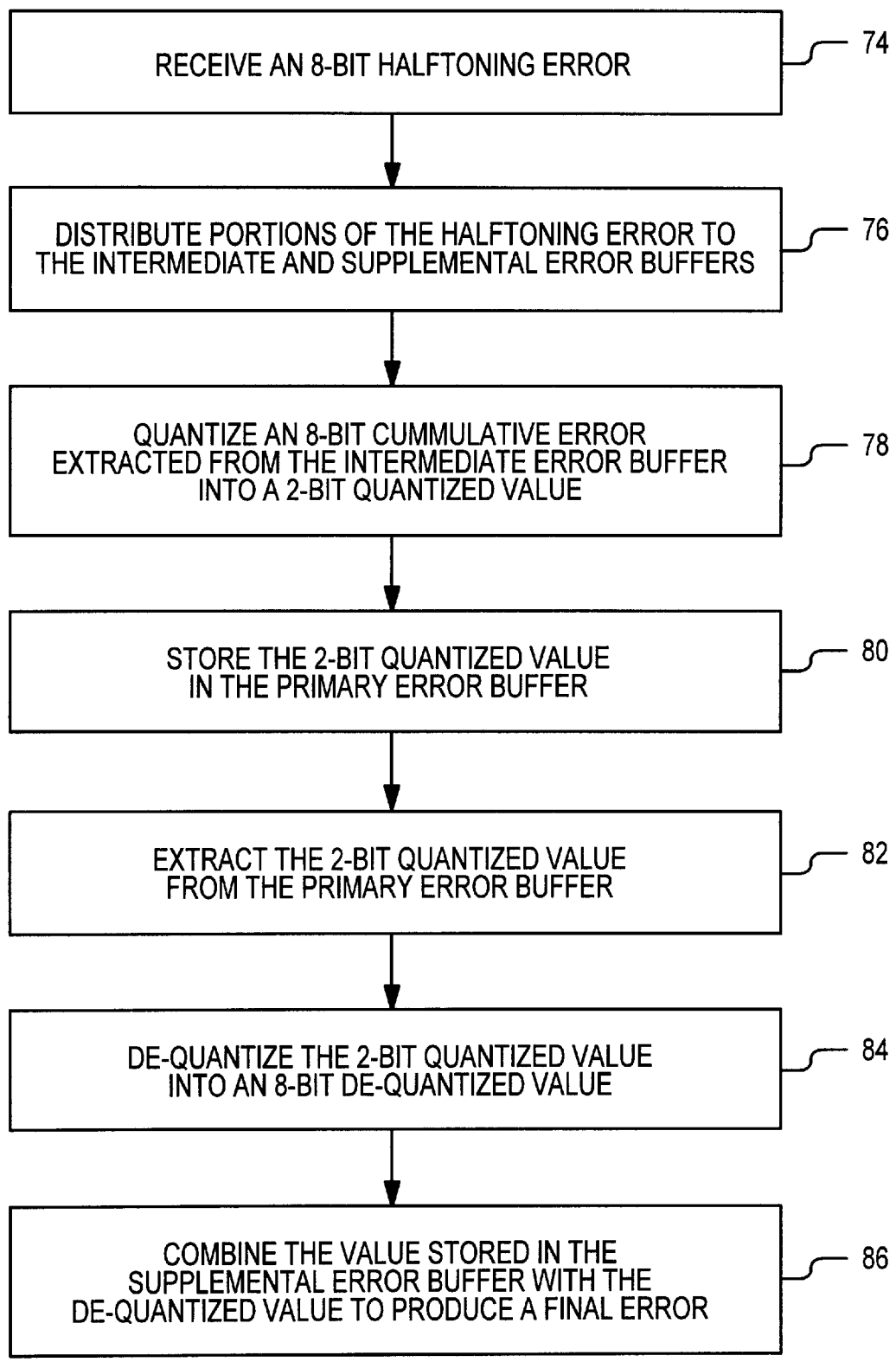
FIG. 6 is a flow diagram of a method of managing halftoning errors for error diffusion halftoning in accordance with the invention.

A method of managing halftoning errors for error diffusion halftoning, using the EDH device 32 of the system 30, will be described with references to FIGS. 2 and 6. At step 74, an 8-bit halftoning error associated with the current pixel of a digital image being processed by the system is received by the error diffuser 24 of the EDH device. The halftoning error is a result of a thresholding procedure to convert the grayscale value of the current pixel, including errors from other pixels that are introduced to the gray-scale value, to a halftone value. Next, at step 76, portions of the halftoning error are distributed to the intermediate and supplemental error buffers 38 and 40 of the QED module 34 by the error diffuser. These portions of the halftoning error will eventually be diffused to the unprocessed neighboring pixels of the current pixel. At step 78, an 8-bit intermediate error extracted from the intermediate error buffer is quantized by the quantization unit 64 into a 2-bit value. Assuming that the Floyd-Steinberg scheme is utilized to distribute the halftoning error, the intermediate error includes a portion of the halftoning error. This 2-bit quantized value is then stored in a designated bin of the primary error buffer 36, at step 80. In one embodiment, a resulting quantization error is distributed to the bins 42 and 43 of the primary error buffer and the bin of the supplemental error buffer, so that the quantization error can also be diffused to some of the unprocessed neighboring pixels. In another embodiment, the entire quantization error is distributed to the supplemental error buffer, so that the quantization error can be added to the grayscale value of the next pixel to be processed. In both embodiments, the value stored in the supplemental error buffer includes a portion of the halftoning error, as well as either a portion of the quantization error or the entire quantization error.

At step 82, the stored quantized value is extracted from the primary error buffer 36, when a grayscale value of a subsequent pixel is being processed. The subsequent pixel is one of the unprocessed neighboring pixels of the current pixel. Next, at step 84, the quantized value is de-quantized by the de-quantization unit 66 of the QED module 34. At step 86, the value stored in the supplemental error buffer 40 is combined with the de-quantized value to produce a final error. The value stored in the supplementary error buffer includes a portion of the halftoning error and a portion of the quantization error or the entire quantization error from the preceding pixel. The final error is combined with the gray-scale value of the subsequent pixel to generate a halftone signal. In this manner, the halftoning and quantization errors that are associated with each pixel of the input image are processed by the EDH device 32.

Although the system and method in accordance with the present invention have been described with respect to grayscale printing, the system and method can be readily applied to color printing. For color printing application, the thresholding and error accumulation may be executed separately for each color plane, or in another appropriate manner which might be more suitable for color printing.

What is claimed is:

1. A method of managing halftoning errors for error diffusion halftoning comprising steps of:

receiving a halftoning error that is based on a pixel value of a current pixel, said current pixel being one of a plurality of pixels that define an input image;

diffusing said halftoning error by distributing portions of said halftoning error to temporary storages;

quantizing an intermediate error that is to be assigned to a subsequent pixel of said input image to be processed, said intermediate error containing at least a distributed portion of a halftoning error that is associated with one of processed pixels of said input image, said current pixel being a member of said processed pixels;

storing said quantized intermediate error in a buffer; and de-quantizing said quantized intermediate error, said de-quantized intermediate error being a basis for a final error that will be combined with a pixel value of said subsequent pixel, said pixel value of said subsequent pixel being utilized to derive a subsequent halftoning error.

2. The method of claim 1 further comprising a step of distributing at least a portion of a quantization error to one of said temporary storages, said quantization error being a result of said step of quantizing said intermediate error.

3. The method of claim 2 wherein said step of distributing at least said portion of said quantization error includes a step of assigning said quantization error in entirety to a neighboring pixel of said current pixel that is to be subsequently processed.

4. The method of claim 2 wherein said step of distributing at least said portion of said quantization error is a step of distributing three apportioned quantization errors derived from said quantization error to said temporary storages.

5. The method of claim 4 wherein said step of distributing said three apportioned quantization errors includes a step of computing said three apportioned quantization errors from said quantization error using multiplicative parameters A, B and C, where A=0.5, B=0.25 and C=0.25.

6. The method of claim 1 wherein said step of quantizing said intermediate error is a step of quantizing an 8-bit intermediate error that is to be assigned to said particular neighboring pixel of said current pixel into a 2-bit quantized value.

7. The method of claim 6 wherein said step of storing said quantized intermediate error in said buffer is a step of storing said 2-bit quantized value in a 2-bits-per-bin buffer.

8. The method of claim 1 wherein said step of diffusing said halftoning error includes a step of computing said portions of said halftoning error using predetermined multiplicative parameters.

9. The method of claim 8 wherein said step of computing said portions of said halftoning error is a step of computing said portions of said halftoning error using multiplicative parameters a, b, c and d, where a=3/16, b=5/16, c=1/16 and d=7/16.

10. A system for printing halftone images comprising:
- input means for acquiring an image having a plurality of pixel values;
- summing means operatively connected to said acquiring means for combining a current pixel value of said image to a corresponding final error to derive a summed value, said associated final error including errors associated with previously processed pixel values of said image;
- processing means operatively connected to said summing means for generating a halftone value and a halftoning error from said summed values;
- output means operatively connected to said processing means for depositing a printing matter in response to said halftone value, if said halftone value is a predefined value;
- error-diffusing means operatively connected to said processing means for distributing said halftoning error into designated storages;
- first storing means operatively connected to said error-diffusing means for storing at least a first portion of said halftoning error;
- quantizing means operatively connected to said first storing means for converting a stored value in said first storing means into a quantized value, said stored value including a distributed error from one of processed pixel values of said image, said processed pixel values including said current pixel value;
- second storing means operatively connected to said quantizing means for storing said quantized value; and
- de-quantizing means operatively connected to said second storing means for converting said quantized value into a de-quantized value, said de-quantized value being used to derive a final error for a subsequent pixel value of said image.

11. The system of claim 10 wherein said second storing means includes an error buffer, said error buffer having a plurality of 2-bit bins such that said quantized value can be stored in one of said 2-bit bins of said error buffer.

12. The system of claim 11 wherein said first storing means includes an intermediate error buffer, said intermediate error buffer having a plurality of 8-bit bins such that said portion of said halftoning error can be stored in one of said 8-bit bins of said intermediate error buffer.

13. The system of claim 10 further comprising a second error-diffusing means operatively coupled to said quantizing means for distributing a quantization error to at least one of said designated storages, said quantization error being derived as a result of a quantization operation executed by said quantizing means.

14. The system of claim 13 wherein said second error-diffusing means is configured to generate three apportioned quantization errors from said quantization error using multiplicative parameters A, B and C, where A=0.5, B=0.25 and C=0.25.

15. The system of claim 14 wherein said second error-diffusing means is coupled to a supplementary error buffer to transfer an apportioned quantization error that will be introduced to a next pixel value of said image to be processed, said apportioned quantization error being derived using said multiplicative parameter A, said supplementary error buffer being one of said designated storages.

16. The system of claim 10 wherein said error-diffusing means is configured to generate three apportioned halftoning errors using multiplicative parameters a, b, c and d, where a=3/16, b=5/16, c=1/16 and d=7/16.

17. A method of managing halftoning errors for error diffusion halftoning comprising steps of:
- receiving a grayscale value of a current pixel, said current pixel being one of a plurality of pixels that define an input image to be processed;
- summing said pixel value of said current pixel and an associated final error to produce a summed value, said final error being derived from at least one previously processed pixel of said input image;
- deriving a halftone value from said summed value of said current pixel;
- computing a halftoning error from said summed value and said halftone value;
- distributing portions of said halftoning error to temporary storages to diffuse said halftoning error to neighboring pixels of said current pixel;
- quantizing an intermediate error that is to be assigned to a subsequent pixel to be processed, said intermediate error containing a selected portion of said halftoning error;
- storing said quantized intermediate error in a buffer; and
- de-quantizing said quantized intermediate error to derive a final error that is associated with said subsequent pixel.

18. The method of claim 17 wherein said step of quantizing said intermediate error is a step of quantizing an 8-bit intermediate error that is to be assigned to said subsequent pixel to be processed into a 2-bit quantized value.

19. The method of claim 17 further comprising a step of distributing a quantization error to at least one of said temporary storages, said quantization error being a result of said step of quantizing said intermediate error.

20. The method of claim 19 wherein said step of distributing said quantization error is a step of distributing said quantization error in entirety to a supplemental buffer, said supplemental buffer being operatively configured such that said quantization error can be introduced to a pixel value of said subsequent pixel.

21. The method of claim 19 wherein said step of distributing said quantization error includes a step of generating three apportioned quantization errors from said quantization error for said distribution.

22. The method of claim 21 wherein said step of generating said three apportioned quantization errors is a step of generating said three apportioned quantization errors using multiplicative parameters A, B and C, where A=0.5, B=0.25 and C=0.25.

23. The method of claim 17 wherein said step of distributing said portions of said halftoning error includes a step of computing said portions of said halftoning error using predetermined multiplicative parameters.

24. The method of claim 17 wherein said step of distributing said portions of said halftoning error further includes a step of transferring a particular portion of said halftoning error to a supplemental buffer, said supplemental buffer being operatively configured such that said particular portion of said halftoning error can be introduced to a pixel value of said subsequent pixel.

25. The method of claim 23 wherein said step of computing said portions of said halftoning error is a step of computing said portions of said halftoning error using multiplicative parameters a, b, c and d, where a=3/16, b=5/16, c=1/16 and d=7/16.

* * * * *